March 30, 1954
C. B. BUSSER
2,673,688
THERMOSTAT CONTROL FOR GAS STOVES
Filed July 12, 1952
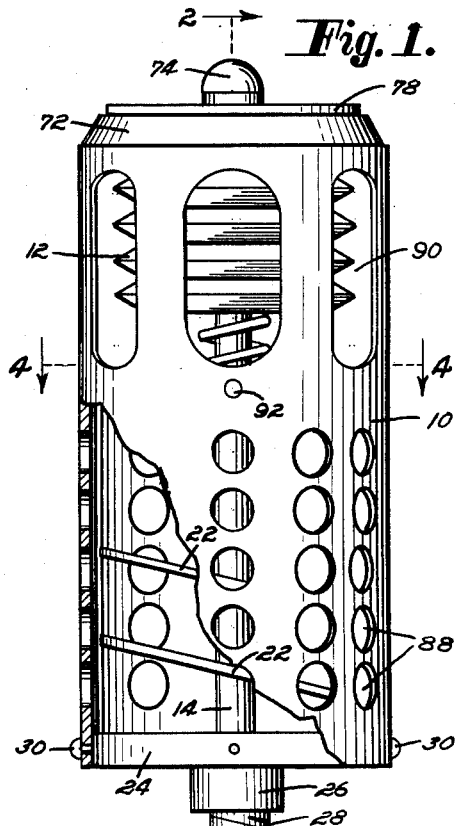
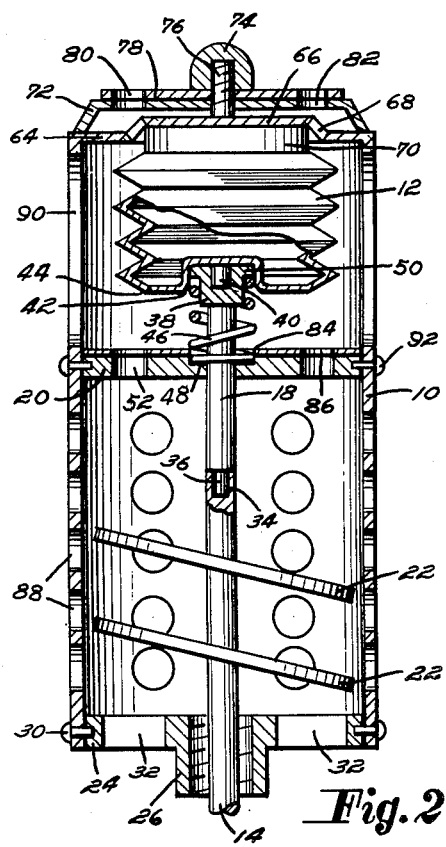
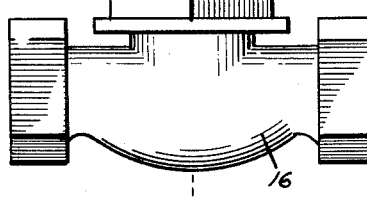
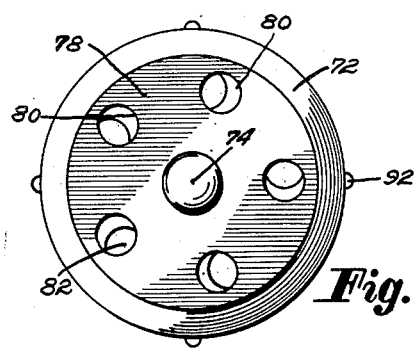
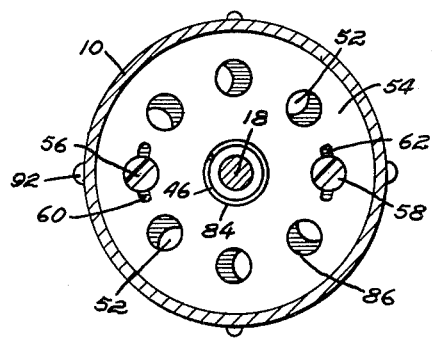
INVENTOR.
CLAUDE B. BUSSER
BY Arthur H. Sturges
Attorney.

Patented Mar. 30, 1954

2,673,688

UNITED STATES PATENT OFFICE 2,673,688

THERMOSTAT CONTROL FOR GAS STOVES

Claude B. Busser, Horton, Kans.

Application July 12, 1952, Serial No. 298,589

4 Claims. (Cl. 236—99)

This invention relates to thermostatic control devices for valves of fuel lines wherein the control device opens and closes a valve, or adjusts the area of a passage through the valve with changes in the temperature of a room or enclosure in which the control device is positioned, and in particular the invention includes a perforated housing in which a temperature responsive element is positioned, and a plurality of devices adjustably mounted in the housing with which the circulation of cool air over the temperature responsive element is controlled.

The purpose of this invention is to eliminate the possibility of cold gas or other fuel flowing through the valve drawing heat downwardly through the connecting shaft of the valve and away from the temperature responsive element which results in repeated opening actions of the fuel valve and over-heating of a room or enclosure in which the control device is positioned.

In addition to the cold fuel passing through the valve drawing heat downwardly from the temperature responsive element the passage of the cold fuel through the valve permits cool air to pass upwardly over the element, thereby increasing the opening action of the valve, and this creates a false condition which also increases the temperature of the room or enclosure.

With this thought in mind this invention contemplates a temperature responsive element in the form of a bellows positioned on a shaft extended from a stem of a control valve, a housing having openings through the wall positioned around the bellows, and a plurality of baffles positioned in spaced relation in the housing.

The object of this invention is, therefore, to provide means for protecting a temperature responsive element which controls a fuel valve from cool air resulting from cold fuel passing through the valve.

Another object of the invention is to provide means for forming a shaft connecting a temperature responsive element to a valve stem whereby a section of non-heat conducting material is incorporated in the shaft.

Another important object of the invention is to provide a protecting device for preventing false currents of cool air contacting a temperature responsive element controlling a fuel valve wherein the parts are adjustable to regulate the circulation of air over the element.

A further object of the invention is to provide means for mounting a shield of a temperature responsive element controlling a fuel valve on a nipple extending from the valve whereby the action of the element is regulated by turning the shield on the nipple.

A still further object of the invention is to provide means for shielding a temperature responsive element connected to and operating a fuel supply valve from cool air currents and cold transmitted through the valve stem as a result of cold fuel passing through the fuel supply valve, in which the shielding means is of a simple and economical construction.

With these and other objects and advantages in view the invention embodies a fuel valve having a valve stem and a threaded nipple positioned around the stem, a shaft having a section of non-heat conducting material therein extended from the valve stem, a bellows positioned on the end of the shaft, a perforated cylindrical housing carried by said nipple and positioned around the bellows, a partition having openings therethrough positioned in the housing and angularly disposed baffles also having openings therethrough and also positioned in the housing.

Other features and advantages of the invention will appear from the following description taken in connection with the drawing, wherein:

Figure 1 is a side elevational view illustrating the improved temperature responsive element housing with parts broken away and part of the housing shown in section, and showing the device on a fuel control valve.

Figure 2 is a vertical section through the housing of the temperature responsive element taken on line 2—2 of Figure 1 with part of the element broken away and part shown in section.

Figure 3 is a plan view of the housing.

Figure 4 is a sectional plan through the housing taken on line 4—4 of Figure 1.

Referring now to the drawing wherein like reference characters denote corresponding parts the improved thermostatic control device of this invention includes an outer cylindrical housing 10, a bellows 12 positioned on the upper end of a shaft 14 which extends upwardly from the stem of a valve 16 and in which is a section 18 of non-heat conducting material, a horizontally disposed partition 20, positioned in the upper part of the housing, and spaced angularly disposed baffles 22 in the lower part of the housing.

The lower end of the housing is provided with a flange 24 having an internally threaded hub 26 by which it is threaded on a nipple 28 extended from the bonnet section of the valve 16, and the flange, which is secured in the housing with pins 30, is provided with openings 32 through which air passes upwardly into the housing.

The upper end of the shaft 14 is provided with a socket 34 in which a pin 36 on the lower end of the section 18 of the shaft is positioned. The upper end of the section 18 is positioned against the lower surface of a cup 38 into which a pin 40 in a recess 42 in the lower end 44 of the bellows 12 extends. The cup and bellows are urged upwardly by a spring 46, the lower end of which is positioned in a recess 48 of the partition 20, and the upper end of which bears against a flange 50 on the upper end of the cup 38.

The partition 20 is provided with openings 52 and a disc 54 that is positioned on the upper surface of the partition is provided with similar openings. The disc 54 is secured in adjusted positions on the partition with screws 56 and 58 which extend through slots 60 and 62, respectively, in the disc and which are threaded in the partition. By this means the area of the openings through the partition and disc is readily adjustable.

The upper end 64 of the housing is formed with a raised section 66 and a row of openings 68 is provided in the portion connecting the section 66 with the end 64. The bellows 12 is provided with a cylindrical-shaped section 70 on the upper end and the section 70 extends into the raised section, as shown in Figure 2. The upper end of the housing also includes a frustro-conical shaped member 72 retained on the outer surface thereof with a nut 74 and the nut, which is threaded on a stud 76 extending from the raised section 66, also holds a disc 78 in adjusted positions on the outer surface of the member 72.

An annular row of openings 80 is provided in the disc 78 and these openings are positioned to register with similar openings 82 in the member 72. The area of these openings is also adjustable by turning the disc on the member 72, as shown in Figure 3.

The disc 54 on the partition 20 is provided with a centrally disposed opening 84 through which the spring 46 extends, and the baffles 22, which are carried by the shaft 14 may or may not be provided with openings, such as the openings, which are indicated by the numeral 86, in the disc 54, as may be desired.

The lower part of the housing 10 is provided with rows of openings 88, and elongated slots 90 are provided in the upper part thereof.

With the parts arranged in this manner the opening and closing movements of the valve are controlled by turning the housing with the hub 26 turning on the nipple 28, as with downward movement of the hub the upper end of the shaft moves upwardly into the bellows. Upon expansion of the bellows by heat the shaft moves downwardly reducing the fuel passage through the valve, and as the bellows cools the spring 46 moves the lower end of the bellows upwardly, whereby the valve opens.

With the temperature responsive element or bellows installed in a shield or housing of this type the bellows is insulated from direct contact with the fuel valve by the section 18 of non-heat conducting material in the shaft, and direct passage of cool air upwardly from the area around the valve is obstructed by the angularly positioned baffles and horizontally positioned partition 20 which is secured in the housing with pins 92, and which may be closed completely, or adjusted to permit a small amount of air to circulate over the bellows.

From the foregoing description it is thought to be obvious that a thermostatic control constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. A thermostatic valve regulator comprising a cylindrical housing having openings in the wall thereof, said housing having a closed end with openings in said end, a transversely disposed partition having openings therethrough extended across said housing, a flange having openings therethrough and having a threaded hub, said flange positioned in the end of the housing opposite to the closed end, a shaft extended through the hub of the flange and partition, a bellows positioned between the end of the shaft and closed end of the housing, and angularly positioned baffles positioned on said shaft.

2. A thermostatic valve regulator comprising a cylindrical housing having an open end, a substantially closed end having openings therein, and having openings through the wall thereof, a transversely disposed partition extended across said housing and positioned intermediate of the ends thereof, said partition having openings therethrough, means adjusting the area of the openings through said partition, a flange having a threaded hub positioned in the open end of the housing, said flange having openings therethrough, a shaft having a section of non-heat conducting material therein in the housing and extended through the hub of the flange and partition, a bellows positioned between the end of the shaft and substantially closed end of the housing, and a spring on the shaft and positioned between the bellows and partition.

3. In a thermostatic control for a fuel valve, the combination which comprises a valve body, a threaded nipple extended from said valve body, a shaft extended into the valve body for actuating the valve, said shaft having a section of non-heat conducting material therein, a cylindrical housing having a substantially closed end and an open end positioned around said shaft, said housing having openings through the wall thereof, a centrally positioned hub extended from the open end of the housing, said hub threaded on said nipple extended from the valve body, a partition extended across said housing, said partition having openings therethrough, means regulating the area of the openings through the partition, angularly positioned baffles positioned in said housing, a bellows positioned between the substantially closed end of the housing and shaft whereby expansion of the bellows moves the shaft in relation to the housing, a spring positioned between the bellows and partition in the housing, a frusto-conical shaped member having openings therein positioned against the substantially closed end of the housing, and means regulating the area of the openings of the frusto-conical shaped member.

4. In a thermostatic valve regulator, the combination which comprises a vertically disposed housing having a compartment in the upper end with openings for circulation of air through the housing and compartment, a temperature responsive bellows mounted in said compartment, a partition in the housing dividing the compartment from the housing, said partition having openings therethrough, means for regulating the areas of the openings of said partition, means for regulating the areas of openings in the upper end of the compartment, a shaft having a section of non-heat-conducting material therein extended from the bellows, through the partition, and extended from the lower end of the housing, and a plurality of angularly disposed baffles carried by said shaft and positioned in the lower part of the housing.

CLAUDE B. BUSSER.

References Cited in the file of this patent

UNITED STATES PATENTS

| Number | Name | Date |
|---|---|---|
| 1,752,390 | Nelson | Apr. 1, 1930 |
| 1,870,895 | Carson | Aug. 9, 1932 |
| 1,882,803 | Giesler | Oct. 18, 1932 |
| 2,253,866 | Quoos | Aug. 26, 1941 |
| 2,311,408 | Martin | Feb. 16, 1943 |
| 2,372,863 | Stuart | Apr. 3, 1945 |
| 2,507,911 | Keller | May 16, 1950 |